US012601420B2

(12) United States Patent
Knepple

(10) Patent No.: US 12,601,420 B2
(45) Date of Patent: Apr. 14, 2026

(54) 3/3 WAY SOLENOID VALVE

(71) Applicant: Robert Brian Knepple, Kalamazoo, MI (US)

(72) Inventor: Robert Brian Knepple, Kalamazoo, MI (US)

(73) Assignee: Depatie Fluid Power Co., Portage, MI (US)

( * ) Notice: Subject to any disclaimer, the term of this patent is extended or adjusted under 35 U.S.C. 154(b) by 0 days.

(21) Appl. No.: 18/534,371

(22) Filed: Dec. 8, 2023

(65) Prior Publication Data

US 2024/0369150 A1 Nov. 7, 2024

Related U.S. Application Data

(60) Provisional application No. 63/386,608, filed on Dec. 8, 2022.

(51) Int. Cl.
*F16K 31/06* (2006.01)
*F16K 27/02* (2006.01)

(52) U.S. Cl.
CPC ...... *F16K 31/0627* (2013.01); *F16K 27/0263* (2013.01); *F16K 31/0606* (2013.01)

(58) Field of Classification Search
CPC ............. F16K 27/0263; F16K 31/0606; F16K 31/0627
See application file for complete search history.

(56) References Cited

U.S. PATENT DOCUMENTS 3,022,799 A * 2/1962 Padula ................ F16K 31/0627
251/129.21
3,043,336 A 7/1962 Parent et al.
3,203,447 A 8/1965 Bremner et al.
(Continued)

FOREIGN PATENT DOCUMENTS

DE 102018218970 A1 * 5/2020 ............. F02M 37/24
DE 102018124310 B4 8/2020
(Continued)

OTHER PUBLICATIONS

Translation DE102018218970 (Year: 2020).*
Translation DE 102022110448 (Year: 2023).*
Translation EP 3086334 (Year: 2016).*

*Primary Examiner* — Umashankar Venkatesan
(74) *Attorney, Agent, or Firm* — Mark L. Maki; Miller Canfield

(57) ABSTRACT

A solenoid valve comprises spring loaded poppets that selectively seal an inlet supplied from a pump and an outlet that exhausts. The spring loaded poppets are carried by an armature in axially aligned relation and maintain both the inlet port and outlet part normally closed, wherein the armature is movable to open one of the inlet or outlet while the other remains closed. Two independent solenoid coils are provided to move the armature in opposite directions, wherein the armature is movable interiorly of the bobbin and has sufficient stroke to displace and seat one poppet or the other. The solenoid coils are selectively energized to pull the poppet away from its respective seat on the inlet or outlet to allow selective flow to and from a communications port for selectively pressurizing and depressurizing the communications port and interconnected components such as one or more air bladders.

20 Claims, 13 Drawing Sheets

(56)  References Cited

U.S. PATENT DOCUMENTS

| | | | | |
|---|---|---|---|---|
| 3,232,312 | A | 2/1966 | Lansky et al. | |
| 3,842,860 | A * | 10/1974 | Stampfli | F16K 31/0627 |
| | | | | 251/129.1 |
| 4,559,971 | A * | 12/1985 | Bradshaw | F16K 31/082 |
| | | | | 137/596.17 |
| 4,629,099 | A | 12/1986 | Jones | |
| 4,690,371 | A * | 9/1987 | Bosley | H01F 7/18 |
| | | | | 251/129.08 |
| 5,734,310 | A | 3/1998 | Ankney et al. | |
| 6,026,860 | A * | 2/2000 | Teichmann | F16K 31/06 |
| | | | | 251/129.1 |
| 6,880,564 | B2 | 4/2005 | Erickson | |
| 7,896,018 | B2 * | 3/2011 | Erickson | F04B 49/225 |
| | | | | 251/129.21 |
| 8,322,376 | B2 | 12/2012 | Ho | |
| 10,655,748 | B2 | 5/2020 | Ho | |
| 11,255,455 | B2 | 2/2022 | Goers et al. | |
| 11,649,906 | B2 | 5/2023 | Park | |

FOREIGN PATENT DOCUMENTS

| | | | | |
|---|---|---|---|---|
| DE | 102022110448 A1 * | 11/2023 | | F16K 31/0606 |
| EP | 0353965 A2 * | 2/1990 | | F16K 31/0627 |
| EP | 3086334 A1 * | 10/2016 | | F16K 31/0606 |

* cited by examiner

3/3 WAY SOLENOID VALVE

CROSS REFERENCE TO RELATED APPLICATIONS

This application claims priority to U.S. Provisional Application No. 63/386,608, filed Dec. 8, 2022, the disclosure of which is incorporated herein by reference in its entirety.

FIELD OF THE INVENTION

The invention relates to an improved 3/3 way solenoid valve construction for various applications.

BACKGROUND OF THE INVENTION

Solenoid valves are generally known and have various constructions. One application for a solenoid valve is a stackable valve array for a hospital bed. In known hospital beds, a stackable solenoid valve may be provided to control each zone in the bed for inflating and deflating air bladders. A known bed configuration had seven air zones, but there is a desire to increase the number of zones.

Therefore, it is an object of the invention to provide an improved solenoid valve and in particular, an improved solenoid valve in a 3/3 way valve configuration.

The solenoid valve of the present invention is a 3/3 way valve that preferably is configured for use in controlling the inflation and deflation of one or more bladders in a bed such as a hospital bed. The solenoid valve is connected to a supply of air, such as a pump, and is configured provide air from the pump to a multi-chamber bladder in a first operative condition and exhaust air from the bladder to a tank or even the ambient environment in a second operative condition. The valve preferably is quiet when used in a hospital application, and an armature or plunger preferably may be wetted due to a possible vacuum condition. As a general term of art, wetted materials are parts of a component, such as a valve, that contact the fluid that flows through the device. Generally, such fluids may be liquids, gas, or air, and in the present invention, the term wetted refers to contact with the air being supplied and exhausted.

In one aspect of the invention, the solenoid valve of the present invention has a form factor similar to a traditional 3/2 solenoid valve. However, the embodiments of the present invention have two independent solenoid coils on a single bobbin to allow for a push/pull or reciprocal motion of the armature. The solenoid valve includes poppets that selectively seal an inlet supplied from the pump and an outlet that exhausts to the tank or ambient environment, wherein the spring loaded poppets keep both the inlet port and outlet port normally closed (NC) with the port inlet NC1 and outlet NC2 being normally blocked by the two poppets. However, the armature is movable interiorly of the bobbin and has sufficient stroke to displace one poppet or the other to unseat one poppet or the other from the respective port in the opposite direction of actuation. The solenoid valve also includes a fluid communication port or COM port that switchably communicates between the one or more bladders and the inlet for supplying air thereto and the outlet for exhausting air therefrom. In this regard, the coils C1 and C2 are selectively energized to pull the poppet away from its respective seat on the inlet or outlet to allow selective flow to and from the COM port for selectively pressurizing and depressurizing the COM port and interconnected components such as the bladder(s).

Effectively, the improved solenoid valve has three states wherein, generally: 1) a first port can be opened during a pressurizing or filling state; 2) the first and second ports can be closed in a closed state to hold the pressure in a vessel such as a bladder or maintain the vessel empty if exhausted; or 3) a second port or outlet can be opened to vent or exhaust pressurized fluid from the vessel or other system component.

In another aspect of the invention described below, the first and second ports can be specifically configured as an inlet and an outlet (or exhaust) to selectively pressurize and depressurize the communication port or COM port. A further port may be provided as a pressure sensor port.

The solenoid valve of the present invention is operable in multiple states in a compact package and may preferably have the following specifications:

Solenoid Size: Ø15.0 mm×30.75 mm long
Solenoid Series: Valve
Solenoid Mounting: Depends upon application.
Ambient Temperature: 60° F.-80° F.
Coil Specifications:
Rated Voltage: 24 VDC
Rated Resistance: 302 ohms±6%@20° C.
Rated Current: 0.08 amps@24 VDC, 308 ohms & 20° C.
Rated Wattage: 1.92 watts@24 VDC, 308 ohms & 20° C.
Insulation Class: Class "B" (130° C.)
Coil Encapsulation: As needed.
Duty Cycle: 100% Continuous
Electrical Connection: Depends upon application.
Flow Rate: 0.4 scfpm@2 PSI (pump to bed)
Flow Rate: 0.3 scfpm@2 PSI (bed to tank)
Spring Force: 0.12 N (Closed Position)
Orifice: Ø2.0 mm
Number of Operations: 10 million cycles
Noise: O-Ring Soft Stop The detailed description below describes and illustrates further aspects of the inventive solenoid valve. Other objects and purposes of the invention, and variations thereof, will be apparent upon reading the following specification and inspecting the accompanying drawings.

Figure 1A:
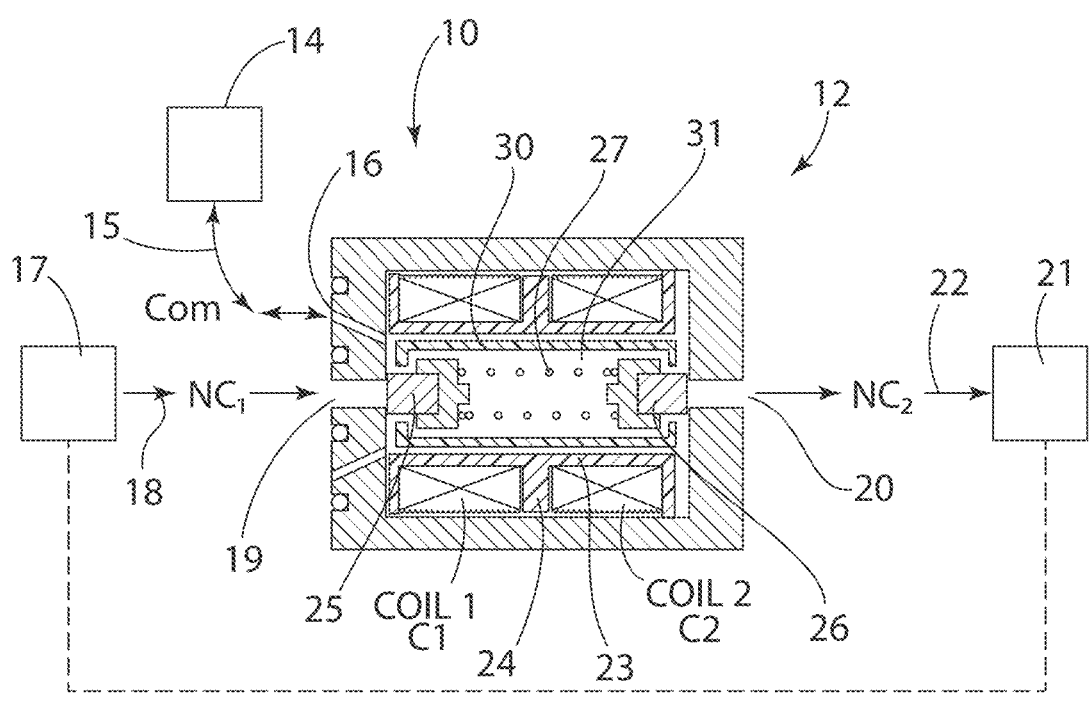
FIG. 1A is a cross-sectional side view of a 3/3 (3 way, 3 position) solenoid valve according to a first embodiment of the present invention.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, a solenoid valves 10 of the present invention is shown in one configuration wherein the solenoid valve 10 may be configured in a stackable valve array for a hospital bed. However, the solenoid valve 10 may be configured for other applications and uses as desired. For example, the solenoid valve 10 may be used in a hospital bed generally referenced by arrow 12 having one or more bladders or fluid storage vessels 14 that define respective patient support zones in the bed 12. One or more stackable solenoid valves 10 may be provided to control each respective zone in the bed 12 for inflating and deflating the air bladders 14. A known bed configuration has seven air zones, but the solenoid valves 10 have a compact package so that they are particularly suitable to increase the number of zones. Therefore, the invention relates to the improved solenoid valve 10 that is provided in a compact, a 3/3 way valve configuration.

The solenoid valve 10 of the present invention is a 3/3 way valve that preferably is configured for use in controlling the inflation and deflation of one or more of the bladders 14 in the bed such 12 as a hospital bed. One or more of the bladders 14 may be a multi-chamber bladder. The solenoid valve 10 connects to the bladder 14 or other storage vessel by a bidirectional communication or COM line 15 that that connects to a communication or COM port 16 that allows fluid flow into and out of the bladder 14 for inflating and deflating same.

The solenoid valve 10 is connected to a supply of air 17, such as a pump, by a supply line 18 that connects to an inlet port or inlet 19 and is configured to provide air from the pump 17 to the multi-chamber bladder 14 when the solenoid valve 10 is in a first operative condition as will be described herein.

The solenoid valve 10 also includes an outlet port or outlet 20 that allows flow out of the solenoid valve 10 so as to exhaust air from the bladder 14 to a tank 21 or even the ambient environment. The tank 21 connects to the outlet 20 by an exhaust line 22 so that the fluid typically flows in one direction.

To control the fluid or air flow into and out of the bladder 14, the solenoid valve 10 of the present invention is configured as a 3/3 solenoid valve 10. As seen in FIG. 1, the solenoid valve 10 has two independent solenoid coils C1 and C2 wound on a single bobbin 23 and separated by flange 24, wherein the solenoid coils C1 and C2 are selectively energized to allow for a push/pull or reciprocating motion.

The solenoid valve 10 includes first and second poppets 25 and 26 that can simultaneously engage the interior ends of the inlet 19 and outlet 20 to selectively seal the inlet 19 supplied with air from the pump 17 or other air supply and seal the outlet 20 that exhausts air to the tank 21 or ambient environment. An intermediate spring or other biasing member 27 acts in opposite directions against the inner ends of the poppets 25 and 26 to bias same away from each other. The spring loaded poppets 25 and 26 are biased by the spring 27 and keep both the inlet port 19 and outlet port 20 normally closed (NC) with the inlet port 19 being normally closed NC1 in this condition and the outlet 20 also being normally closed NC2. As such, when the coils C1 and C2 are not energized, the inlet port 19 and outlet port 20 are normally blocked by the two poppets 25 and 26 to prevent airflow between the supply line 18, communication line 15 and exhaust line 22. This represents a first operative state wherein the first and second ports 19 and 20 can be closed in this closed state to hold the pressure in a pressure vessel such as a bladder 14 or maintain the vessel or bladder 14 empty if the bladder 14 was previously depressurized or exhausted.

However, the poppets 25 and 26 are each supported at opposite ends of a movable, reciprocating armature 30. The armature 30 has an axial length less than the distance between the inlet and outlet 19 and 20 so that it is axially movable, but the poppets 25 and 26 themselves project axially out of the armature 30 under spring pressure to normally close the inlet and outlet 19 and 20 when the armature 30 is in a neutral position. The poppets 25 and 26 also can move independent of each other inwardly into the armature interior 31 if the spring 27 is able to compress and allow such movement, which occurs in the other two operative valve states described below.

As mentioned, the armature 30 has a length shorter than the distance between the inlet and outlet 19 and 20 so that the armature 30 is movable interiorly of the bobbin 23 through an reversible armature stroke that is sufficient to displace one poppet 25 or 26 or the other poppet 26 or 25 to thereby unseat one poppet or the other from the respective port in the opposite direction of movement of the armature 30. This reciprocating armature movement is performed by energizing one coil C1 to move the armature 30 in one direction or energizing the other coil C2 to displace the armature 30 in the opposite direction. When one or the other of the coils C1 or C2 is energized, this moves the armature 30 in a respective direction to pull or unseat one of the poppets 25 or 26 away from its respective inlet or outlet 19 or 20 while maintaining the other poppet 26 or 25 in sealed, seated engagement with its respective outlet or inlet 20 or 19. In this manner, the coils C1 and C2 can be energized to open one of the inlet 19 or 20 while the other of the inlet or outlet 19 or 20 remains closed.

As mentioned, the solenoid valve 10 also includes the fluid communication port or COM port 16 that switchably communicates between the bladder 14 and either the inlet 19 for supplying air thereto or the outlet 20 for exhausting air therefrom. In this regard, the coils C1 and C2 are selectively energized to pull the poppet 25 away from its respective seat on the inlet 19 or the poppet 26 away from its respective seat on the outlet 20 to allow selective flow to and from the COM port 16. When the inlet 19 is opened by separating the poppet 25 therefrom, the outlet 20 remains closed by the poppet 26 in contact therewith such that the inlet 19 selectively pressurizes the COM port 16 and the bladder 14 connected thereto. When the outlet 20 is opened by separating the poppet 26 therefrom, the inlet 19 is closed by the poppet 25 in contact therewith such that the outlet 20 selectively depressurizes the COM port 16 and the bladder 14 connected thereto.

Effectively, the improved solenoid valve 10 has three operative states or positions wherein, generally: 1) a first port or inlet 19 can be opened in a first valve open state to define a pressurizing or filling state by which the bladder 14 is pressurized and inflated; 2) a second port or outlet 20 can be opened in a second valve open state to vent or exhaust pressurized fluid from the vessel 14 or other system component; and 3) the first and second ports i.e. the inlet 19 and outlet 20, can be closed in a closed valve state to hold the pressure in the vessel such as the bladder 14 or else maintain the vessel 14 empty or depressurized if previously exhausted in the second valve open state above.

Figure 1B:
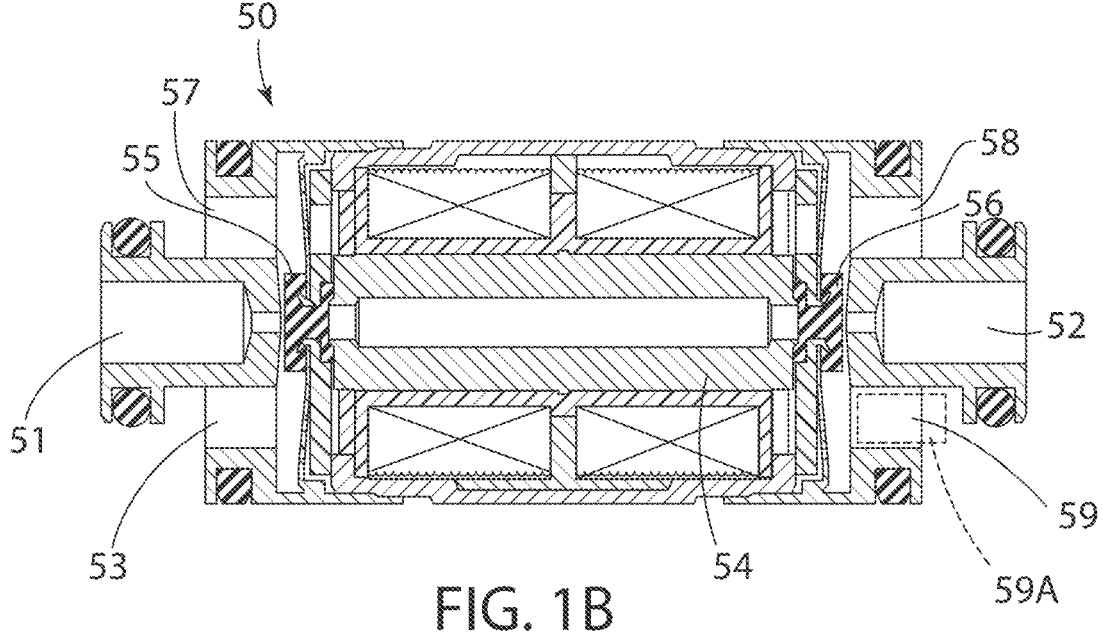
FIG. 1B is a cross-sectional side view of a 3/3 way solenoid valve according to a second embodiment of the present invention.

In another aspect of the invention shown in FIG. 1B, a modified solenoid valve 50 is shown, wherein the first and second ports can again be configured as an inlet 51 and an outlet (or exhaust) 52 to selectively pressurize and depressurize the communication port or COM port 53. While an inflatable bladder 14 is disclosed above, the vessel may be formed as a pneumatic cycler such that COM port 53 effectively defines a cylinder port. The armature 54 is driven by the coils C1 and C2 in accord with the above description to selectively displace the poppets 55 and 56. Other ports 57, 58 and 59 may be provided, which may be plugged, function as COM ports, or be provided with a pressure sensor 59A such as in port 59. As such, the port 57 on the inlet end may form a second COM port with first COM port 53 for supplying the bladder 14. The outlet end may have the ports 58 plugged or provided with sensor 59A. As can be seen, the embodiment of FIG. 1B is configured with its opposite ends having a mirror image with respect to the inlet and outlet 51 and 52 and the ports 53, 57, 58 and 59 so that the solenoid valve 50 is non-handed and could be installed in either direction, such that the port 52 could be the inlet and port 51 could be the outlet.

Figures 2A, 2B, 2C, 3A, 3B, 3C:
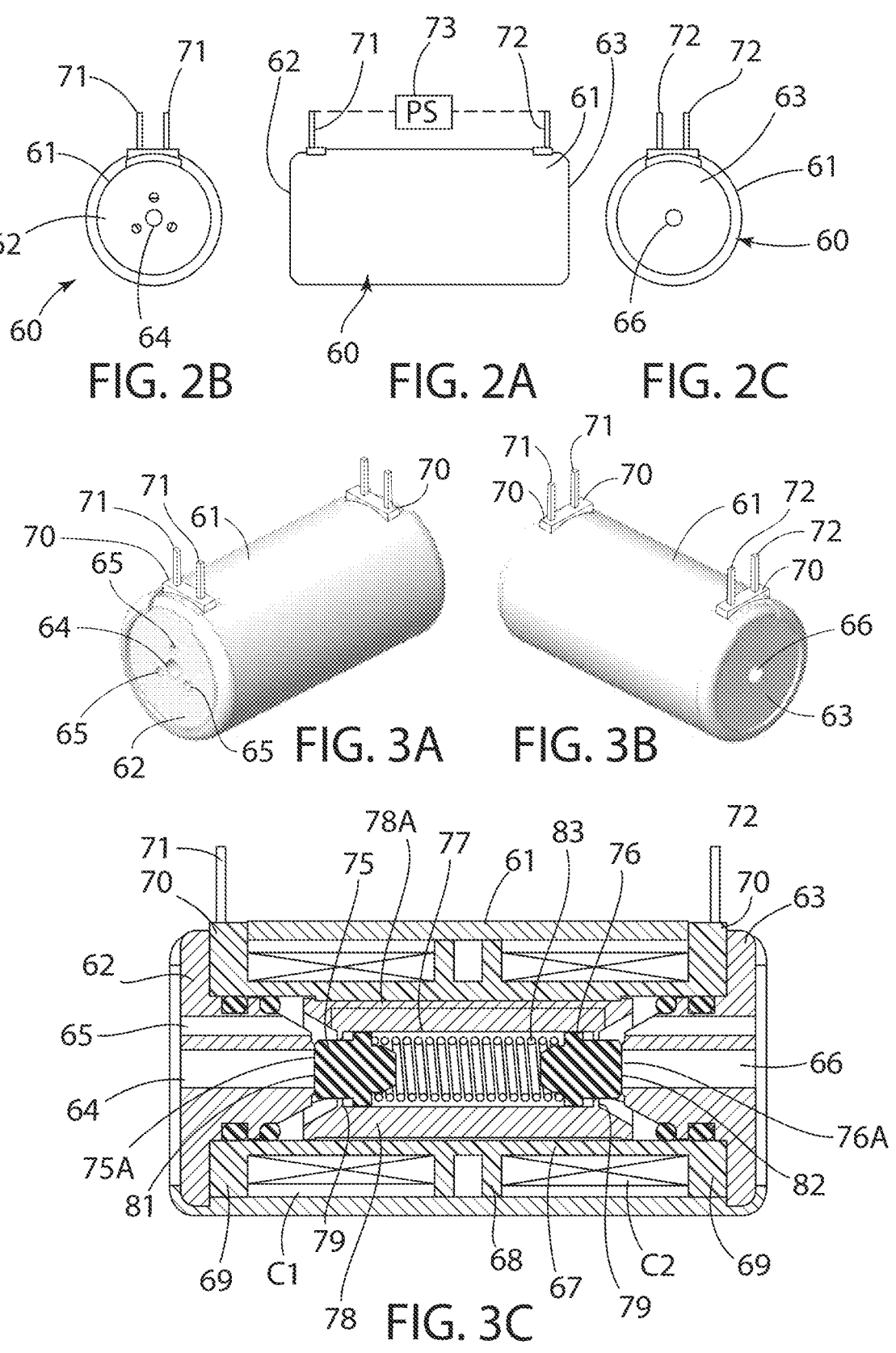
FIG. 2A is a dimensional side view of an inventive solenoid valve according to an improved embodiment of the invention.
FIG. 2B is a left end view thereof showing an inlet port or orifice from a pump and one or more communication ports or orifices supplying air to a pressurized vessel, such as one or more inflatable air bladders of a bed.
FIG. 2C is a right end view thereof showing an exhaust port or orifice such as to a tank.
FIG. 3A is a left end perspective view of the improved solenoid valve shown as a solid model.
FIG. 3B is a right end perspective view of the improved solenoid valve shown as a solid model.
FIG. 3C is a cross-sectional side view of the solenoid valve of FIGS. 3A and 3B.

The detailed description below describes and illustrates a further aspect of the inventive solenoid valve designated by reference numeral 60 In FIGS. 2A-2C. It will be understood that the solenoid valve 60 has substantially similar structure and the same function as solenoid valve 10 described above. FIG. 3A is a left end perspective view of the improved solenoid valve 60 shown as a solid model, and FIG. 3B is a right end perspective view of the improved solenoid valve 60.

Referring to these figures, the solenoid valve 60 has a compact package with a basic housing 61 shaped as a valve housing 61. The opposite ends of the solenoid valve 60 comprise inlet and outlet end walls 62 and 63. FIG. 2B is a left end view thereof showing an inlet orifice 64 connectable to the pump 17 and COM ports 65 connectable to pressure vessels such as the bladders 14 of a bed 12. FIG. 2C is a right end view thereof showing an exhaust port 66 such as to a tank. FIGS. 3A and 3B show the solid models of the improved solenoid valve 60 wherein the housing 61 may be roll crimped to hold the end walls 62 and 63 together while covering the interior valve components. More specific details as to this construction will be provided relative to FIGS. 11-13, while FIGS. 2-10 provide a more general discussion of the function of the solenoid valve 60.

Referring to FIG. 3C, the solenoid valve 60 of the present invention is a 3/3 way valve that preferably is configured substantially the same as solenoid valve 10 so as to function in controlling the inflation and deflation of one or more of the bladders 14 in the bed such 12 as a hospital bed. The solenoid valve 60 is connectable to the bladder 14 or other storage device by the bidirectional communication or COM line 15 that that connects to the communication or COM ports 65 and allows fluid flow into and out of the bladder 14 for inflating and deflating same.

The solenoid valve 60 is connected to the supply of air 17, such as a pump, by the supply line 18 that connects to an inlet port or inlet 64 and is configured provide air from the pump 17 to the multi-chamber bladder 14 when the solenoid valve 60 is in a first operative condition as will be described herein relative to FIG. 9.

The solenoid valve 60 also includes the outlet port or outlet 66 that allows flow out of the solenoid valve 60 so as to exhaust air from the bladder 14 to a tank 21 or even the ambient environment. The tank 21 connects to the outlet 66 by the exhaust line 22 so that the fluid typically flows in one direction.

To control the fluid or air flow into and out of the bladder 14, the solenoid valve 60 of the present invention is configured as a 3/3 solenoid valve. As seen in FIG. 3C, the solenoid valve 60 has two independent solenoid coils C1 and C2 wound on a single bobbin 67 and separated by a middle flange 68, wherein the solenoid coils C1 and C2 are selectively energized to allow for a push/pull or reciprocating motion. End flanges 69 project radially and include terminal blocks 70 that project through the housing wall 61 to allow coil wires 71 and 72 to project exteriorly of the housing wall 61 for connection to one or more power sources 73 (FIG. 2A) for the coils C1 and C2. Typically, the power source 73 will be switched or controlled to selectively and alternately energize and deenergize the coils C1 and C2.

The solenoid valve 60 includes first and second poppets 75 and 76 that can simultaneously engage and selectively seal the inlet 64 and seal the outlet 66. The poppets 75 and 76 may be of an elastomeric sealing material or other suitable material. An intermediate spring or other biasing member 77 acts in opposite directions against the inner ends of the poppets 75 and 76 to bias same away from each other to the positions shown in FIG. 4. The spring loaded poppets 75 and 76 are biased by the spring 77 and keep both the inlet port 64 and outlet port 66 normally closed (NC). As such, when the coils C1 and C2 are not energized, the inlet port 64 and outlet port 66 are normally blocked or sealed by the two poppets 75 and 76 to prevent airflow between the supply line 18, communication line 15 and exhaust line 22. This represents a first operative state wherein the first and second ports 64 and 66 can be closed in this closed state to hold the pressure in a pressure vessel such as a bladder 14 or maintain the vessel or bladder 14 empty if the bladder 14 was previously depressurized or exhausted.

Figure 8:
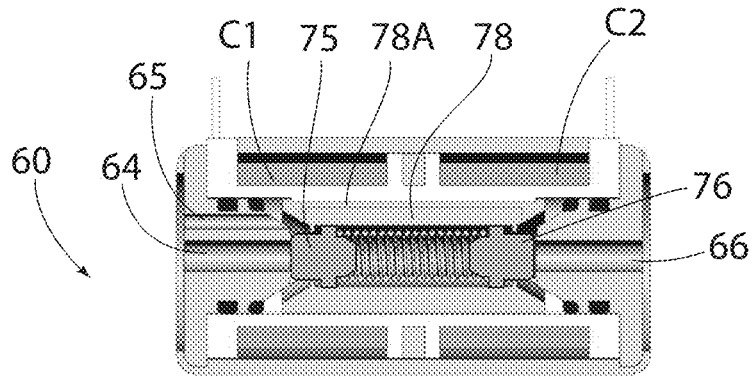
FIG. 8 is a cross-sectional side view showing the solenoid valve in the valve closed position.
Figure 9:
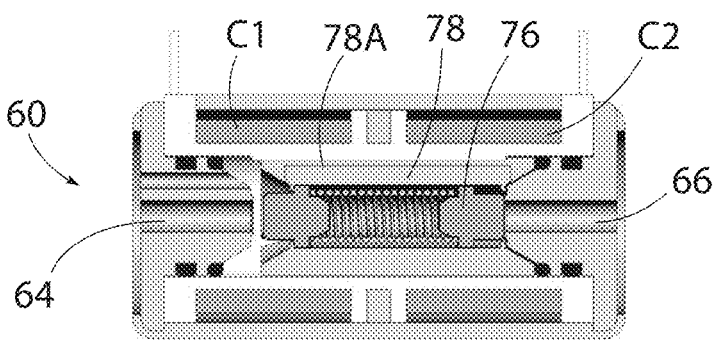
FIG. 9 is a cross-sectional side view showing the solenoid valve in a valve open or supply position to supply air to a bed or bladder.
Figure 10:
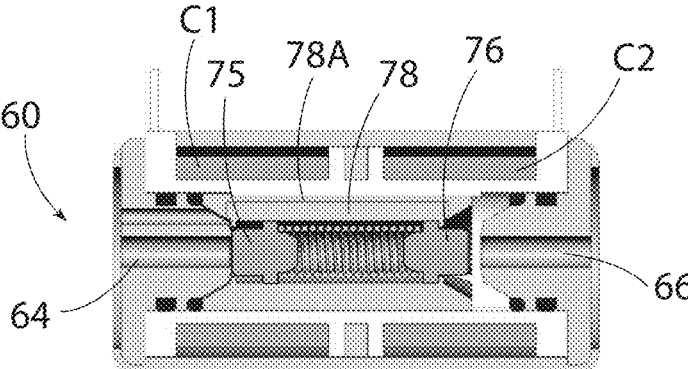
FIG. 10 is a cross-sectional side view showing the solenoid valve in a valve open or exhaust position to exhaust air from the bed or bladder.

The operation of these poppets 75 and 76 will described further relative to FIGS. 8-10. For the time being, the poppets 75 and 76 are supported similar to the poppets 25 and 26 described above. More particularly, the poppets 75 and 76 are each supported at opposite ends of a movable armature 78 within poppet apertures 79 formed in the ends of the armature 78. The poppets 75 and 76 have radial flanges that prevent the poppets 75 and 76 from passing out of the apertures 79 under spring pressure while permitting inward, reciprocal sliding thereof as the spring 77 compresses and extends.

The armature 78 has an axial length less than the distance between the inlet and outlet 64 and 65 so that it is axially movable, but the poppets 75 and 76 have sealing end faces 75A and 76A and project axially out of the armature 78 under spring pressure to contact housing end faces 81 and 82 and normally close the inlet and outlet 64 and 66 in the normal, valve closed condition of FIG. 3C. The poppets 75 and 76 also can move independent of each other inwardly into the armature interior 83 when the spring 77 is compressed as the armature 78 moves axially. The exterior surface of the armature 78 is further provided with at least one axial flow channel 78A that allows air to flow freely between the opposite inlet end and outlet end of the solenoid valve 60.

As mentioned, the armature 78 is movable interiorly of the bobbin 67 through an armature stroke that is sufficient to displace one poppet 75 or 76 or the other poppet 76 or 75 to unseat one poppet or the other from the respective port in the opposite direction of movement of the armature 78. This armature movement is performed by energizing one coil C1 to move the armature 78 in one direction i.e., the leftward direction, or energizing the other coil C2 to displace the armature 78 in the opposite rightward direction. When one or the other of the coils C1 or C2 is energized, this moves the armature 78 in a respective direction to pull or unset one of the poppets 75 or 76 away from its respective inlet or outlet 64 and 66 while maintaining the other poppet 76 or 75 in scaled, seated engagement with its respective outlet 20 or inlet 19. In this manner, the coils C1 and C2 can be energized to reciprocate the armature 77 and open one of the inlet 64 or 66 while the other of the inlet or outlet 64 or 66 remains closed.

The solenoid valve 60 also includes a plurality of the fluid communication ports or COM ports 65 that switchably communicate between the bladder 14 and either the inlet 64 for supplying air thereto or the outlet 66 for exhausting air therefrom. In this regard, the coils C1 and C2 are selectively energized to pull the poppet 75 away from its respective seat on the inlet 64 or the poppet 76 away from its respective seat on the outlet 66 to allow selective flow to and from the COM ports 65. When the inlet 64 is opened by separating the poppet 75 therefrom, the outlet 66 remains closed by the poppet 76 in contact therewith such that the inlet 64 selectively pressurizes the COM ports 65 and the bladder 14 connected thereto. When the outlet 66 is opened by separating the poppet 76 therefrom, the inlet 64 is closed by the poppet 75 in contact therewith such that the outlet 66 selectively depressurizes the COM ports 64 and the bladder 14 connected thereto.

Effectively, the improved solenoid valve 60 has three operative states or conditions wherein, generally: 1) a first port or inlet 64 can be opened in a first valve open state to define a pressurizing or filling state by which the bladder 14 is pressurized and inflated; 2) a second port or outlet 66 can be opened in a second valve open state to vent or exhaust pressurized fluid from the vessel 14 or other system component; and 3) the first and second ports i.e. the inlet 64 and outlet 66, can be closed in a closed valve state to hold the pressure in the vessel such as the bladder 14 or else maintain the vessel 14 empty or depressurized if previously exhausted in the second valve open state above.

Figure 4A:
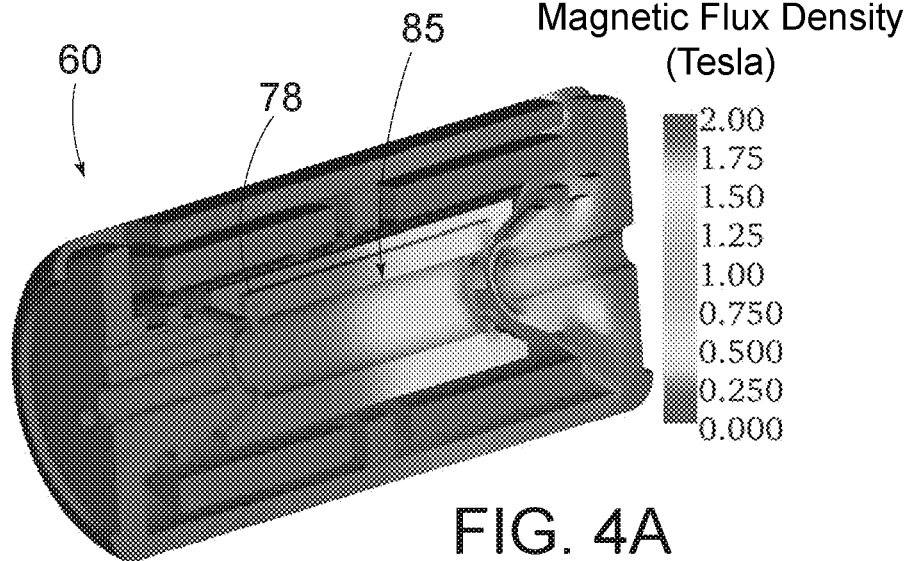
FIG. 4A is a perspective cross-sectional view of a magnetic simulation of the inventive solenoid valve in a valve open position.
Figure 4B:
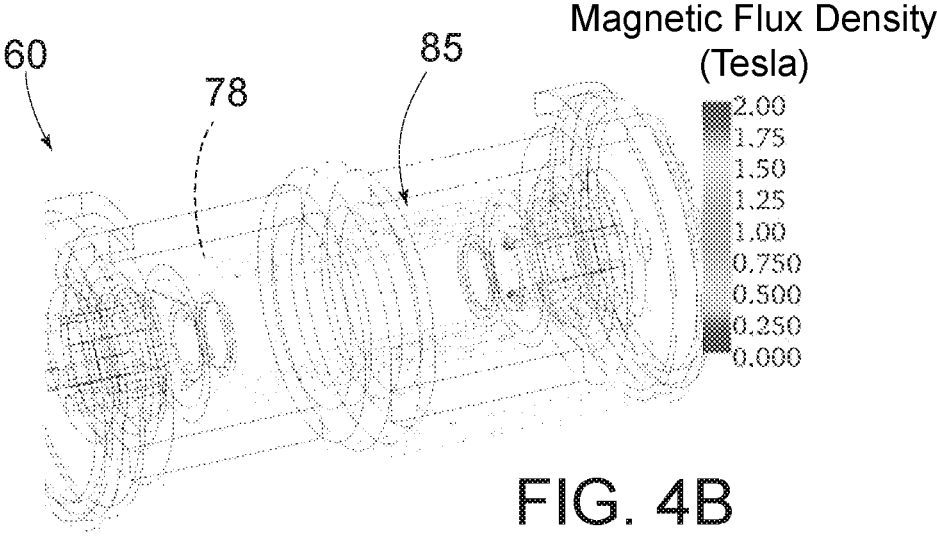
FIG. 4B is a perspective wireframe view of the magnetic simulation of the inventive solenoid valve in the valve open position.

FIGS. 4A and 4B show the performance characteristics of the solenoid valve in a valve closed position. In more detail, FIGS. 4A and 4B illustrate a three-dimensional model of the improved solenoid valve. A force simulation was conducted on the model to generate simulated magnetic forces of the solenoid. FIGS. 4A and 4B show the flux density of the improved solenoid in the normal valve closed position, wherein a relatively low baseline flux area 85 (light area) is present in the valve closed condition. The spring force of the spring 77 generates a sufficient spring force in both axial directions to maintain the armature 78 in the neutral position.

Figure 4C:
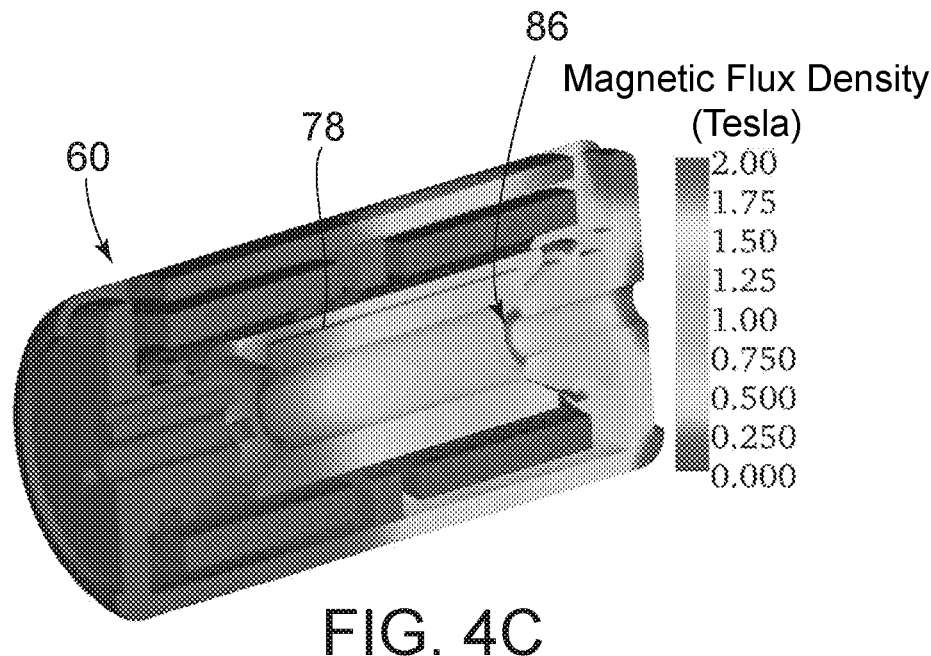
FIG. 4C is a perspective cross-sectional view of a magnetic simulation of the inventive solenoid valve in a valve closed position.
Figure 4D:
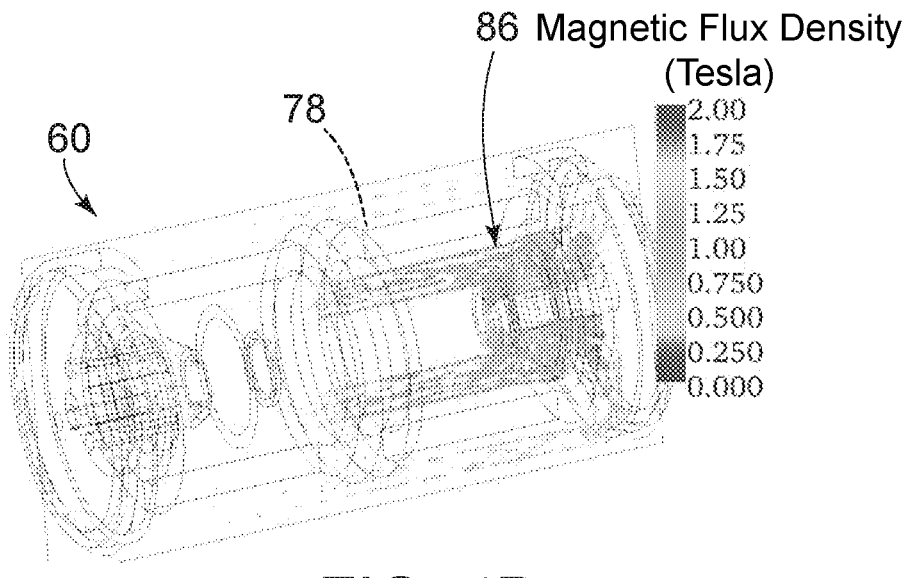
FIG. 4D is a perspective wireframe view of the magnetic simulation of the inventive solenoid valve in the valve closed position.

FIGS. 4C and 4D illustrate a further three-dimensional model of the improved solenoid valve. FIG. 4C shows the flux density of the improved solenoid and FIG. 4D shows the solenoid valve in cross section in a valve open position. FIGS. 4C and 4D shows an area 86 of significantly higher flux density when the coil C2 is energized and pulls the armature 78 to the right. In this case, the pulling force when coil C2 is energized is greater than the spring force of the spring 77 that would tend to resist rightward movement of the armature 78 since the spring 77 compresses to a degree when the armature 78 moves. This is also true when the coil C1 is energized and pulls the armature 78 in the leftward direction.

Figure 5:
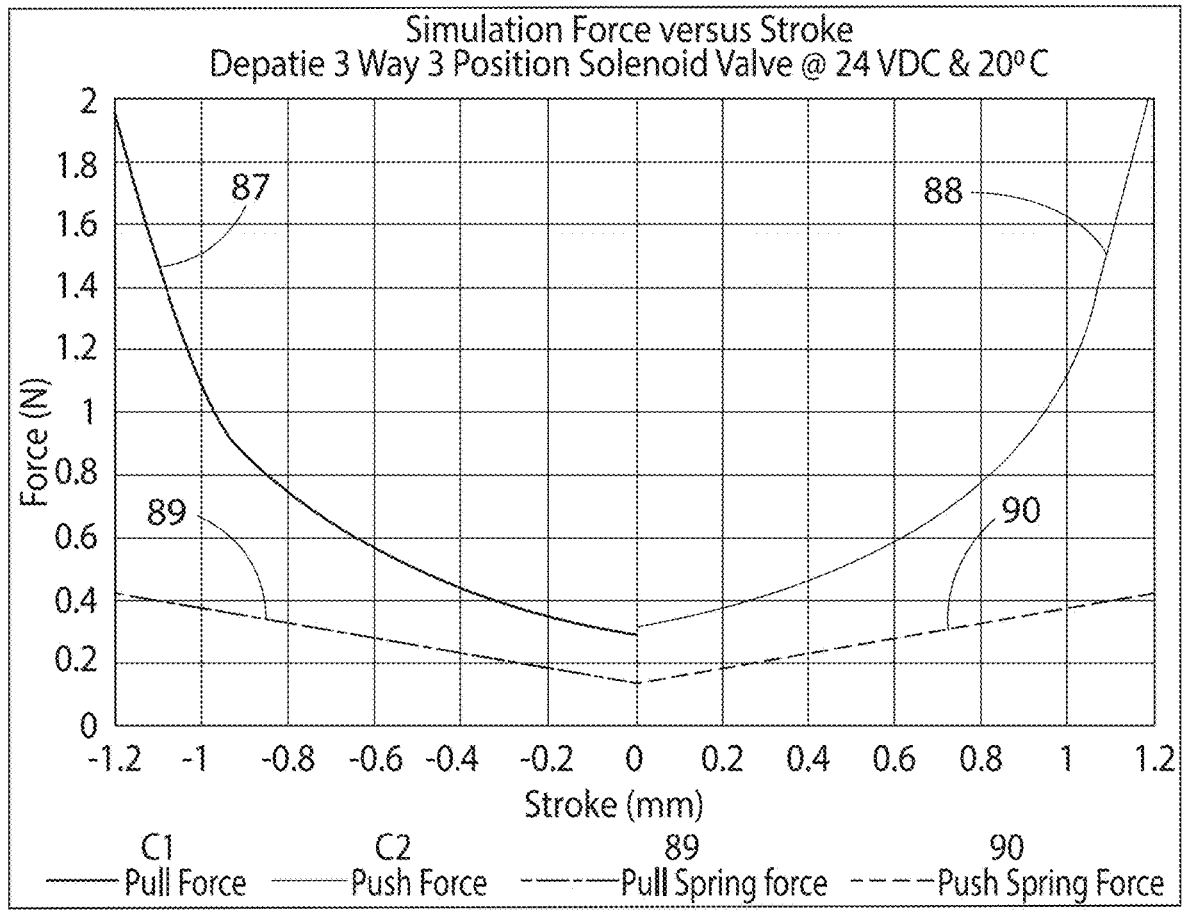
FIG. 5 is a graph showing simulated magnetic forces on the inventive solenoid valve representing a simulation of force versus stroke on the Y-X axes.

Referring to FIG. 5, FIG. 5 is a graph showing simulated magnetic forces on the inventive solenoid valve 60 representing a simulation of force versus stroke on the Y-X axes. The magnetic forces for the inventive solenoid valve 60 were simulated at all operative conditions. The pull forces 87 and 88 generated by the respective coils C1 and C2 were placed on the chart of FIG. 5 to show the increasing pull forces 87 and 88 as it increases to pull the armature 78 to the right or left. The spring 77 tends to resist the pull forces 87 and 88 in opposite directions and the spring force 89 and 90 tend to increase as the armature 78 moves through its stroke which increases the spring compression and thereby increases the spring forces 89 and 90 in a generally linear manner. Notably, the coil pull forces 87 and 88 have a magnitude greater than the spring forces 89 and 90.

Figures 6A, 6B:
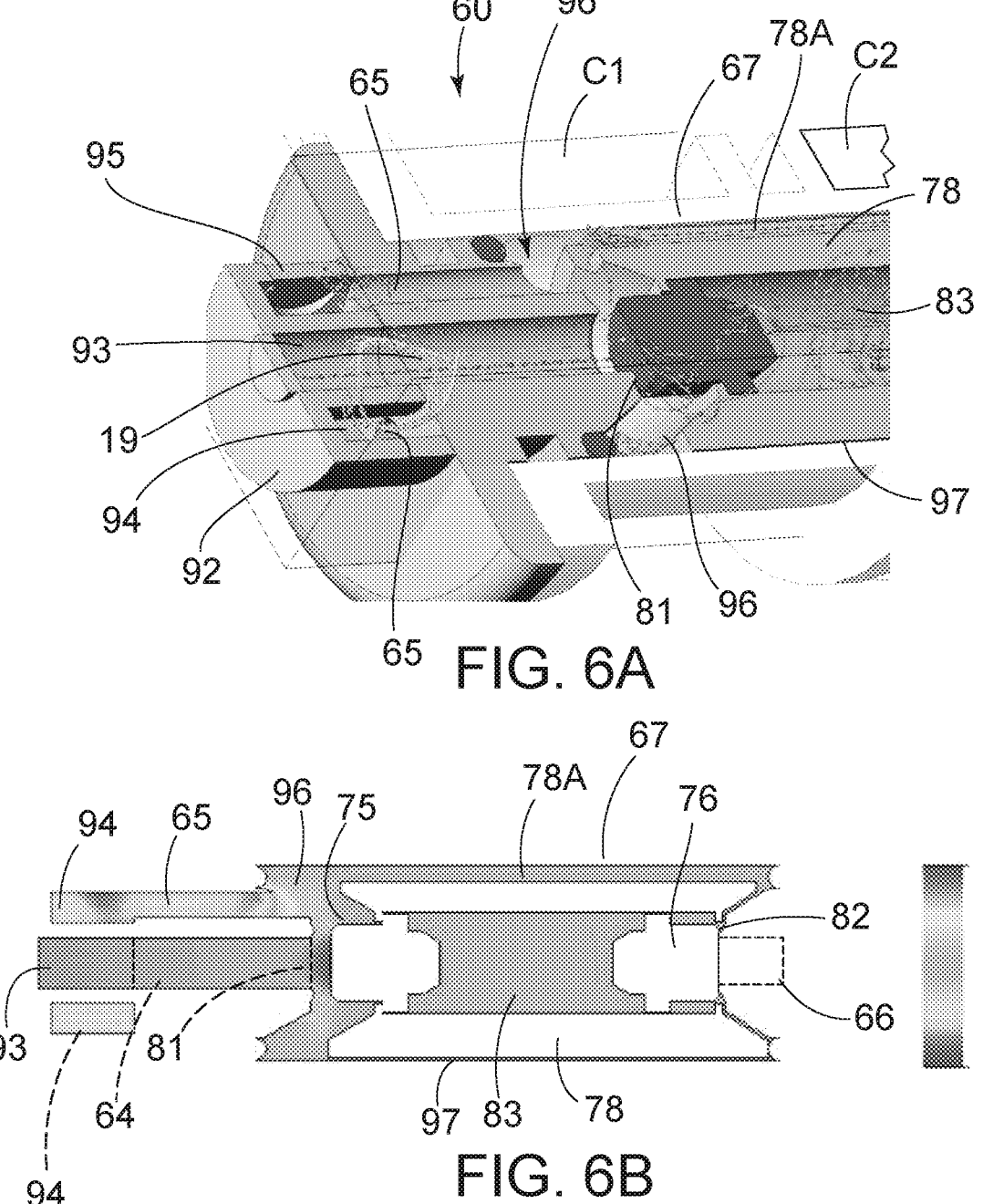
FIG. 6A is a cross-sectional perspective view of the solenoid valve showing a flow simulation in a first valve open position.
FIG. 6B is a diagrammatic side view showing pressure regions thereof.

Referring to FIGS. 6A and 6B, a three-dimensional model of the solenoid valve 60 was created. A fluid or air flow simulation was conducted on the model to generate simulated flow trajectories of the air. FIG. 6A shows the flow simulation of the proposed valve with air flowing from the pump 17 or other air source to the bladders 14 or other pressure vessels of the bed 12 in the first valve open position. In the first valve open position, the coil C2 is energized to displace the armature 78 rightwardly to a first valve open condition in which poppet 81 separates from the inlet surface 81 and opens the inlet 64. In the illustrated embodiment, a manifold cap 92 is mounted over the inlet 64 and includes a central bore 93 aligned with inlet 64, an annular channel 94 that opens axially into the COM ports 65 and one or more radial ports 95 that connect with the pressure line 15.

At the other valve end, the poppet 76 seats against the outlet 66 and closes same. As a supply of pressurized fluid such as air is provided to the central bore 93 of the manifold cap 92, the pressurized air fills the interior of the solenoid valve 60 wherein the interior parts are wetted to facilitate valve operation. The air flows through and pressurizes various internal chambers including the inlet 19, an annular gap 96, the COM ports 65, the annular manifold channel 94, and the manifold ports 95. Further, the pressurized air fills flow channel 78A and an axially elongate gap 97 between the armature 78 and bobbin 67. The air flows up to and around the poppet 76 but cannot enter the outlet 66 due to the spring-biased seal between the poppet 76 and the end face 82 through which the outlet 66 opens.

Figures 7A, 7B:
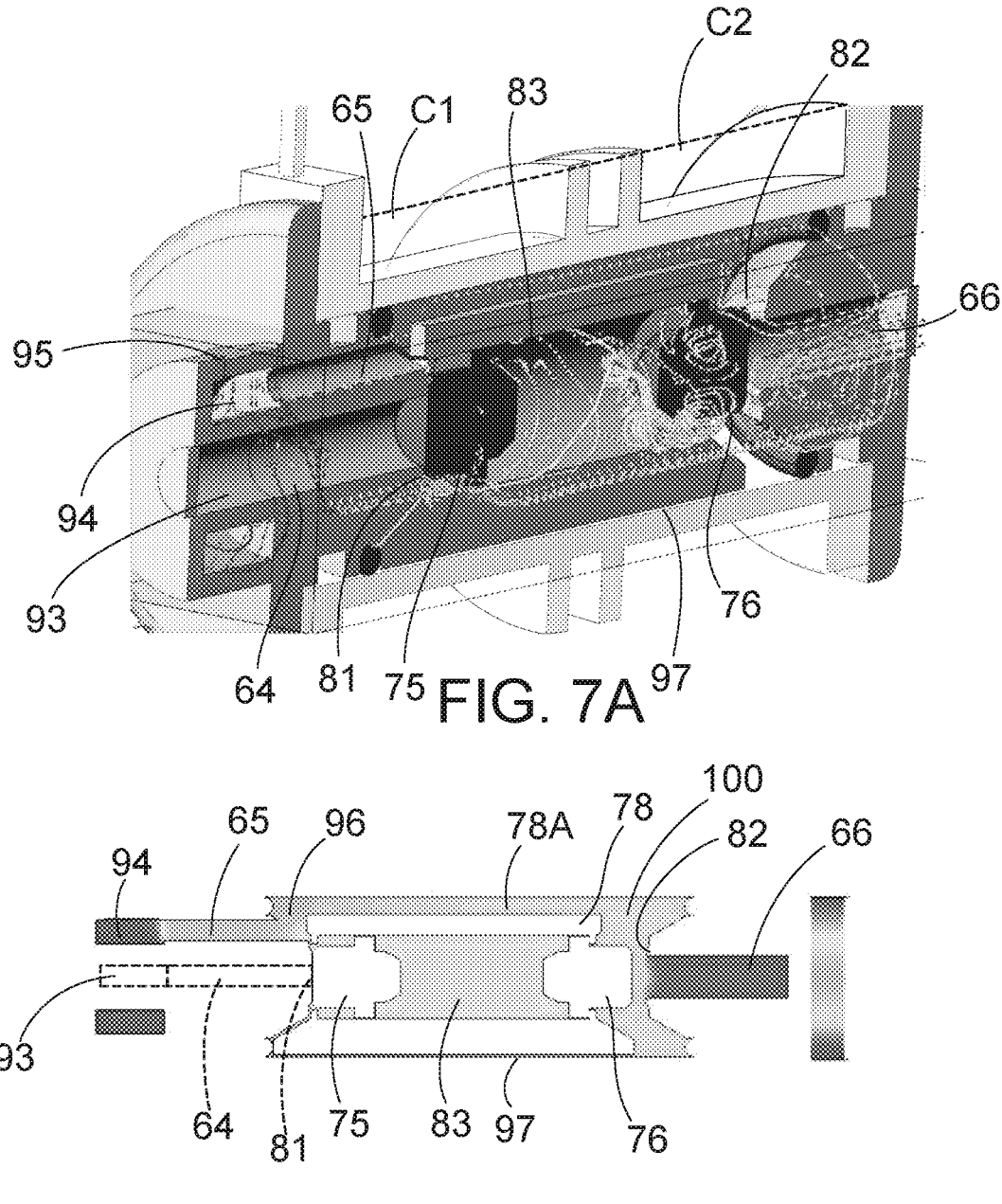
FIG. 7A is a cross-sectional perspective view of the solenoid valve showing a flow simulation in a second valve open position.
FIG. 7B is a diagrammatic side view showing pressure regions thereof.

Next, FIG. 7A is a cross-sectional perspective view of the solenoid valve 60 showing a flow simulation in the second valve open condition or in other words, an open exhaust position. In further detail, FIGS. 7A and 7B shows the flow simulation of the proposed valve with air flowing from the bladder 14 of the bed 12 to the tank 21.

In the second valve open position, the coil C2 is energized to displace the armature 78 leftwardly to the second valve open condition in which poppet 76 separates from the outlet surface 81 and opens the outlet 66. In the illustrated embodiment, the other poppet 75 reseats against the end surface 81 and closes off the inlet 64 and manifold port 93. However, the annular channel 94 of the manifold cap 92 is fluidly separated from the central bore 93 so that the annular channel 94 continues to open axially into the COM ports 65. As such, the one or more radial ports 95 remain connected with the pressure line 15 so that pressurized air can flow back from the bladders 14 or other pressure sources through the manifold ports 95 and COM ports 94 and into the axial flow channel 78A of the armature 78.

Further, the air flows through and pressurizes various internal chambers including the flow channel 78A and an annular gap 100 created at the outlet end by axial displacement of the armature 78 and poppet 76. Further, the pressurized air flows up to and around the poppet 75 but cannot enter the inlet 64 due to the spring-biased seal between the poppet 75 and the end face 81 through which the inlet 64 opens. Here again, the pressurized air fills the interior of the solenoid valve 60 in this second valve open condition wherein the interior parts are wetted to facilitate valve operation. In this second valve open condition, the pressurized air from the bladder 14 is exhausted or depressurized through the outlet 66.

FIGS. 8-10 illustrate the three operative states or conditions for the improved solenoid valve 60 wherein: 1) the first port or inlet 64 can be opened by the poppet 75 in a first valve open state to define a pressurizing or filling state by which the bladder 14 is pressurized and inflated (FIG. 9); 2) the second port or outlet 66 can be opened by the poppet 76 in a second valve open state to vent or exhaust pressurized fluid from the vessel 14 or other system component (FIG. 10); and 3) the first and second ports i.e. the inlet 64 and outlet 66, can be closed by the poppets 75 and 76 in a closed valve state to hold the pressure in the vessel such as the bladder 14 or else maintain the vessel 14 empty or depressurized if previously exhausted in the second valve open state above.

Figure 11:
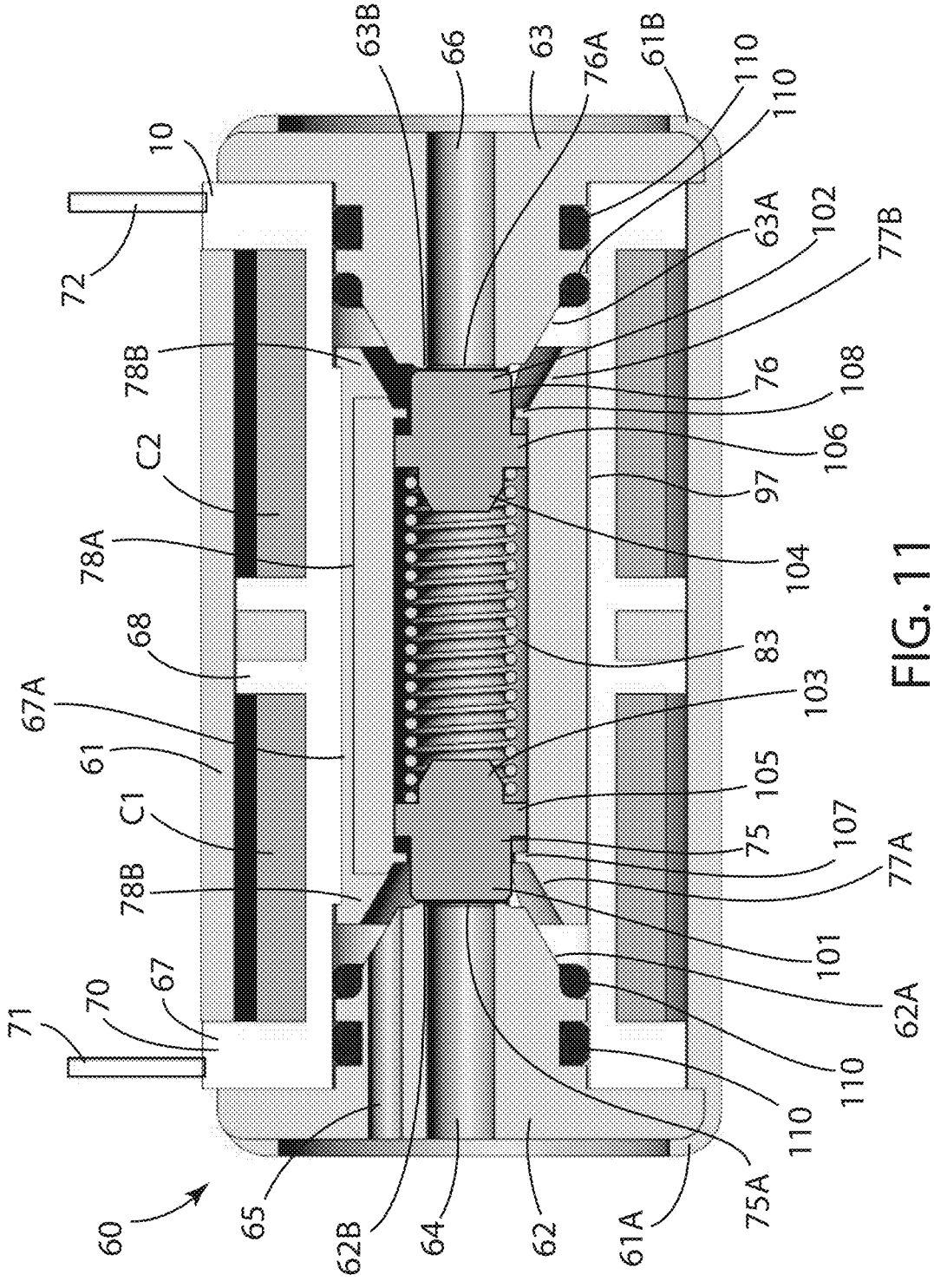
FIG. 11 is an enlarged cross-sectional side view showing the solenoid valve in the valve closed position.

Next, in more detail, FIG. 11 illustrates the solenoid valve 60 in the normally closed valve condition with the poppets 75 and 76 closing the inlet 64 and outlet 66, which occurs when the solenoid coils C1 and C2 are deenergized. The solenoid valve 60 therefore comprises the two independent solenoid coils C1 and C2 wound on a single bobbin 67 and separated by the middle flange 68. The end flanges 69 project radially and include the terminal blocks 70 that project through the housing wall 61 to allow coil wires 71 and 72 to project exteriorly of the housing wall 61. In this configuration, the coil wires 71 and 72 are provided in pairs each comprised of a common ground wire and a DC power wire, which control energization of the coils C1 and C2. The interior bobbin surface lies close to an exterior surface of the armature 78 to define the axial gap 97 therebetween.

The interior bobbin surface may also include a rib 67A that aligns with and fits into the armature passage 78A to guide axial movement of the armature 78. The opposite ends of the armature passage 78A may include notches 78B that align with the COM ports 65 to facilitate air flow therebetween.

The solenoid valve 60 further includes the first and second poppets 75 and 76 that can simultaneously engage and selectively seal the inlet 64 and seal the outlet 66. The poppets 75 and 76 each include a nose 101/102 that projects axially from the armature 78 into sealing engagement with the end surfaces 81 and 82 through which the inlet 64 and outlet 66 open. The poppets 75 and 76 also include a spring boss 103/104 which fit into the respective opposite ends of the spring 77, such that the spring or other biasing member 77 acts in opposite directions against spring bosses 103/104 on the inner ends of the poppets 75 and 76 to bias same away from each other to the positions shown in FIG. 11.

The mid-section of each poppet 75 and 76 includes a stop formation 105/106 formed as an annular rib that engages with a stop flange 107/108 formed in the open ends of the armature 78. As such, the poppets 75 and 76 can reciprocate into the armature 78 to a limited extent but they cannot completely exit the armature 78 since the armature stop flanges 107/108 and the poppet stop formations 105/106 interfere with each other. Since the poppets 75 and 76 can reciprocate, the poppets 75 and 76 and spring 77 essentially float within the armature interior 83. When the coils C1 and C2 are deenergized, the poppets 75 and 76 are held in position against the inlet 64 and outlet 66 and in this condition, there may be a small gap between the armature stop flanges 107/108 and the poppet stop formations 105/106 which may allow some limited axial movement of the armature 78.

As referenced above, the poppets 75 and 76 are biased by the spring 77 and keep both the inlet port 64 and outlet port 66 normally closed (NC). As such, when the coils C1 and C2 are not energized, the inlet port 64 and outlet port 66 are normally blocked or sealed by the two poppets 75 and 76 to prevent airflow between the supply line 18, communication line 15 and exhaust line 22. FIG. 11 therefore represents a first operative state wherein the first and second ports 64 and 66 can be closed in this closed state.

In more detail, the armature 78 has an axial length less than the distance between the inlet and outlet 64 and 65 so that it is axially movable, but the poppets 75 and 76 have sealing end faces 75A and 76A that project axially out of the armature 78 under spring pressure to abut against the end faces 81 and 82.

To enclose these valve components, the solenoid valve 60 has the cylindrical valve housing 61 surrounding the coils C1 and C2, the bobbin 67 and the armature assembly. The opposite ends of the solenoid valve 60 comprise the inlet and outlet end walls 62 and 63 which are sealed in engagement with the bobbin 67 by O-rings 110. The valve housing 61 in turn has opposite end edges 61A and 61B roll crimped over the periphery of each end wall 62 and 63 to form a fixed assembly.

Figure 12:
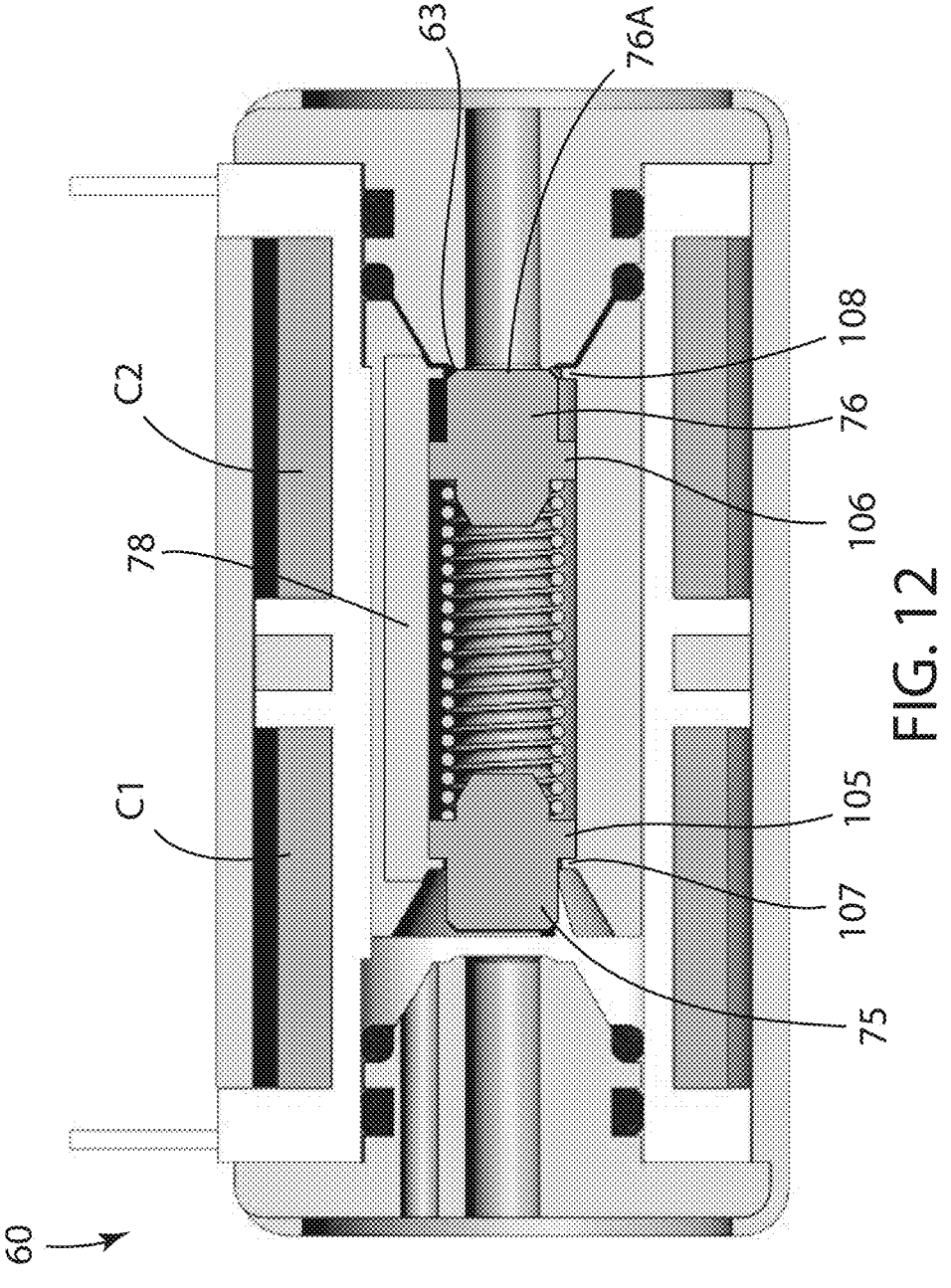
FIG. 12 is an enlarged cross-sectional side view showing the solenoid valve in the valve open or supply position to supply air to a bed or bladder.
Figure 13:
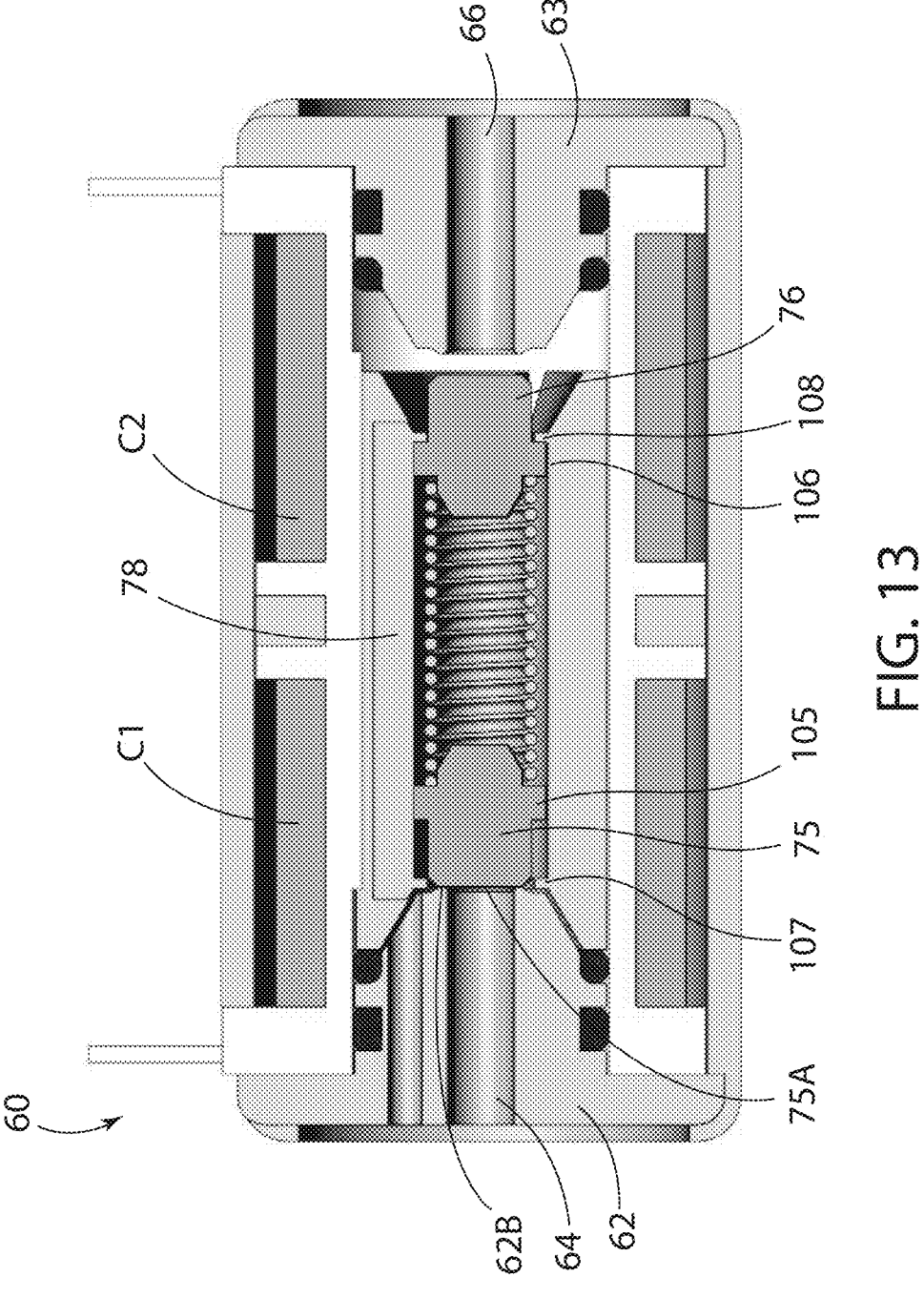
FIG. 13 is an enlarged cross-sectional side view showing the solenoid valve in the valve open or exhaust position to exhaust air from the bed or bladder.

The interior end of each end wall 62 and 63 terminates in an externally conical nose portion 62A and 63A. The opposite ends of the armature 78 also have an internally conical nose portion 77A and 77B that is complementary to the nose portions 62A and 63A. This assists with alignment of the armature 78 as it seats in its opposite directions of movement as seen in FIGS. 12 and 13. The wall nose portions 62A and 63A also may be shaped with a convergent rib 62B and 63B to provide a localized contact area with the poppet faces 75A and 76A to ensure effective sealing.

Referring to FIGS. 12 and 13, the armature 78 is movable interiorly of the bobbin 67 through an armature stroke that is sufficient to displace one poppet 75 or 76 or the other poppet 76 or 75 to unseat one poppet or the other from the respective port in the opposite direction of movement of the armature 78. This armature movement is performed by energizing one coil C1 to move the armature 78 in one direction i.e., the leftward direction of FIG. 13, wherein the poppet end face 75A sealingly engages the end wall rib 62B. As the armature 78 moves left, the armature stop flange 108 engages the poppet stop formation 106 to pull the poppet 76 leftwardly with the armature 78 away from the outlet 66 to open same. The spring 77 compresses and pushes the other poppet 75 against the inlet 64 to close same.

In the second valve open condition, the armature 78 is displaced by energizing the other coil C2 to move the armature 78 in the opposite rightward direction of FIG. 12, wherein the poppet end face 76A sealingly engages the end wall rib 63B. As the armature 78 moves right, the armature stop flange 107 engages the poppet stop formation 105 to pull the poppet 75 rightwardly with the armature 78 away from the inlet 64 to open same. The spring 77 compresses and pushes the other poppet 76 against the outlet 66 to close same. A further detailed description of the operation of the coils C1 and C2 and their affect on the valve components and air flow is provided above and does not require further discussion herein.

Next, a further embodiment of a solenoid valve 160 is illustrated, which incorporates the structure and function of the above embodiments. As such, the following disclosure focuses upon further improvements to the inventive solenoid valve 160.

Figures 14, 15:
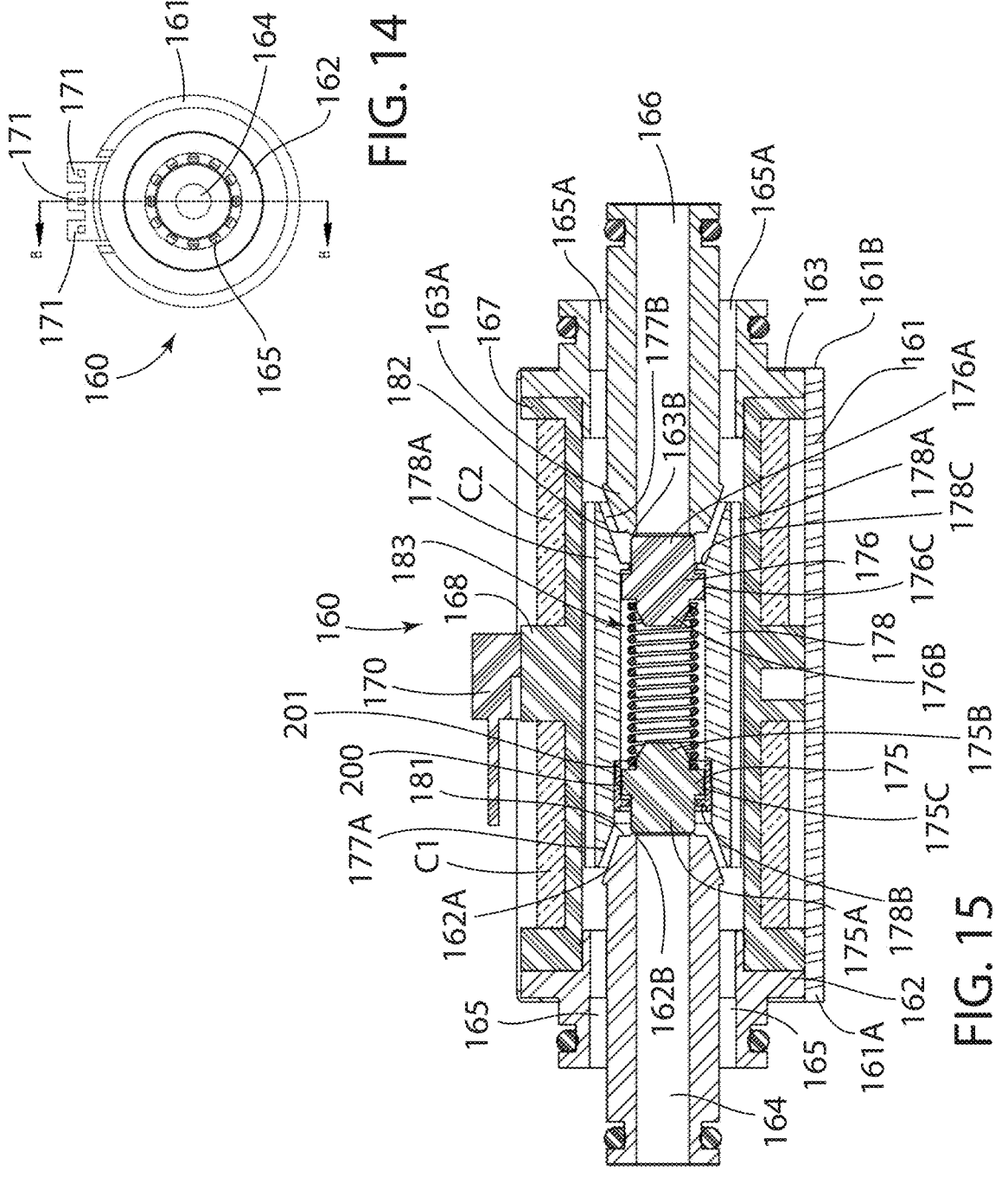
FIG. 14 is an end view of a further embodiment of the solenoid valve of the present invention.
FIG. 15 is a cross-sectional side view thereof in the valve closed position.

FIGS. 14 and 15 illustrate the solenoid valve 160 in the normally closed valve condition with the poppets 175 and 176 closing the inlet 164 and outlet 166, which occurs when the solenoid coils C1 and C2 are deenergized. The solenoid valve 160 therefore comprises the two independent solenoid coils C1 and C2 wound on a bobbin 167 and separated by the middle flange 168 and bounded on their ends by end flanges 169. The middle flange 168 projects radially and includes a terminal block 170 that project through the housing wall 161 to allow coil wires or terminals 171 to project exteriorly of the housing wall a. In this configuration, the coil wires 171 are provided as a group of three comprised of a common ground wire and two DC power wires which control energization of the coils C1 and C2.

The interior bobbin surrounds an armature 178 having a plurality of armature passages 178A that extend axially along the length of the armature 178. The armature 178 is formed with an open-ended hollow interior.

The solenoid valve 160 further includes the first and second poppets 175 and 176 that can simultaneously engage and selectively seal the inlet 164 and seal the outlet 166. The poppets 175 and 176 each include a nose 175A and 176A that projects axially from the armature 178 into sealing engagement with the end surfaces 181 and 182 through which the inlet 164 and outlet 166 open. The poppets 175 and 176 also include a spring boss 175B/176B which fit into the respective opposite ends of the spring 177, such that the spring or other biasing member 177 acts in opposite directions to bias the poppets 175 and 176 away from each other to the positions shown in FIG. 15.

The mid-section of each poppet 175 and 176 includes a stop formation 175C/176C formed as an annular rib that engages with a stop flange 178B/178C formed in the open ends of the armature 178. The stop flange 178C is formed integral with the wall of the armature 178. However, the stop flange 178B is formed on a cup 200 that is fixed into an armature bore 201, preferably by press fit engagement. This allows the poppets 175 and 176 and spring 177 to be loaded into the armature interior 183 and then captured therein by fitting the cup 200 into the bore 201 to form an armature assembly. This cup 200 is therefore configured to slidably support the poppet 175 therein. If desired, the other popper 176 could be supported by a similar cup and press fit configuration.

As such, the poppets 175 and 76 can reciprocate into the armature 178 to a limited extent but they cannot completely exit the armature 178. Since the poppets 175 and 176 can reciprocate, the poppets 175 and 176 and spring 177 essentially float within the armature interior 183. When the coils C1 and C2 are deenergized, the poppets 175 and 176 are held in position against the inlet 164 and outlet 166 and in this condition, there may be a small gap which may allow some limited axial movement of the armature 178 in accord with the above discussion.

As referenced above, the poppets 175 and 176 are biased by the spring 177 and keep both the inlet port 164 and outlet port 166 normally closed (NC). As such, when the coils C1 and C2 are not energized, the inlet port 164 and outlet port 166 are normally blocked or sealed by the two poppets 175 and 176 to prevent airflow between the supply line 18, communication line 15 and exhaust line 22. FIG. 15 therefore represents a first operative state wherein the first and second ports 164 and 166 are closed in this closed state.

To enclose these valve components, the solenoid valve 160 has the cylindrical valve housing 161 surrounding the coils C1 and C2, the bobbin 167 and the armature assembly, which generally comprises the armature 178, spring 177 and the poppets 175 and 176. The above-described embodiments can also be said to comprise and armature assembly comprised of these common components. The opposite ends of the solenoid valve 160 comprise the inlet and outlet end walls 162 and 163 which are sealed in engagement with the bobbin 167. The valve housing 161 in turn has opposite end edges 161A and 161B roll crimped over the periphery of each end wall 162 and 163 to form a fixed assembly.

Figures 16, 17:
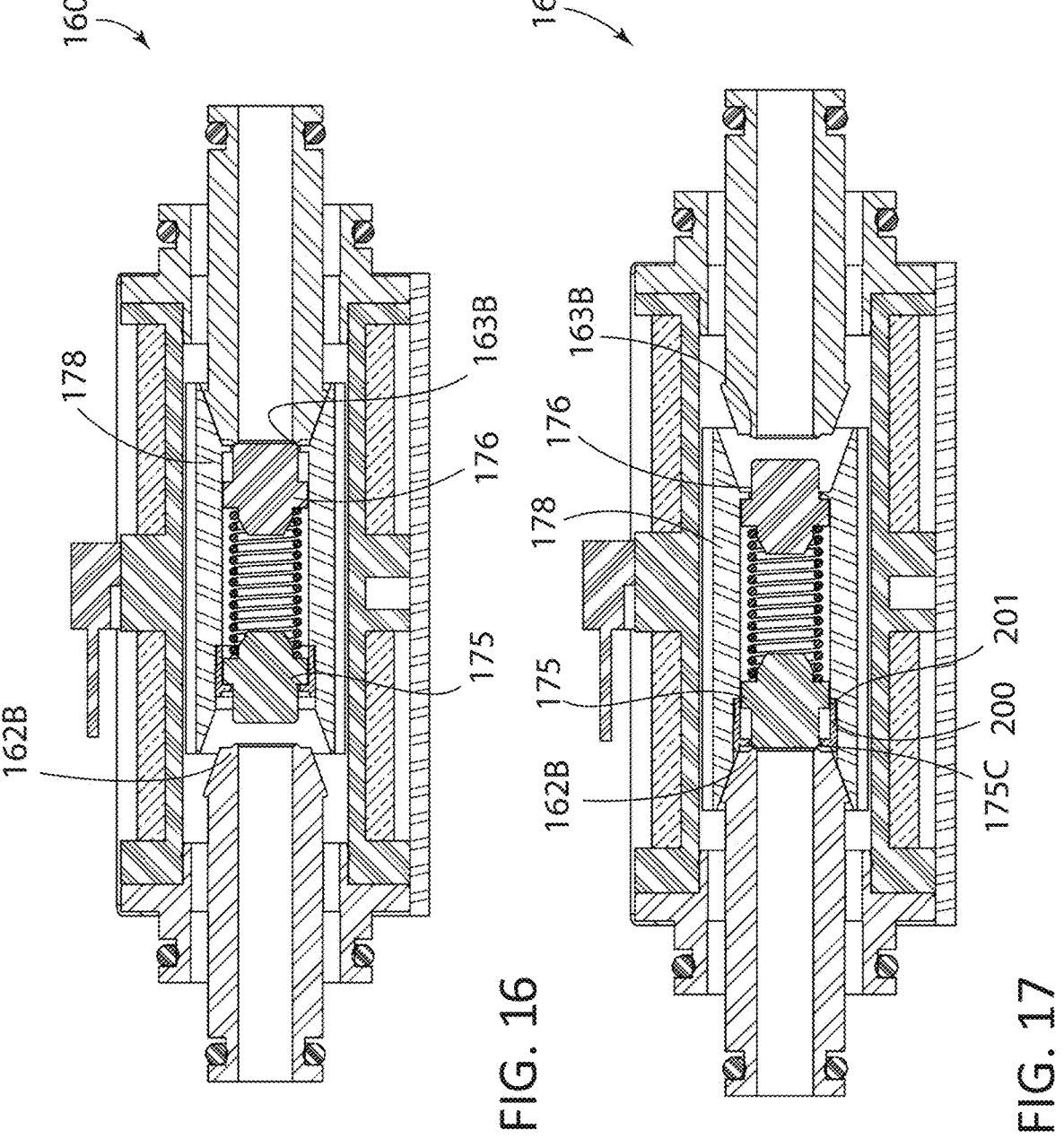
FIG. 16 is a cross-sectional side view thereof in a first valve open position.
FIG. 17 is a cross-sectional side view thereof in a second valve open position.

The interior end of each end wall 162 and 163 terminates in an externally conical nose portion 162A and 163A. The opposite ends of the armature 178 also have an internally conical nose portion 177A and 177B that is complementary to the nose portions 162A and 163A. This assists with alignment of the armature 178 as it reciprocates in opposite directions during use as seen in FIGS. 16 and 17. The wall nose portions 162A and 163A also may be shaped with a convergent rib 162B and 163B to provide a localized contact area with the poppet faces 175A and 176A to ensure effective scaling.

Referring to FIGS. 16 and 17, the armature 178 is movable interiorly of the bobbin 167 through an armature stroke that is sufficient to displace one poppet 175 or 176 from the respective port in the opposite direction of movement of the armature 178. This armature movement is affected by energizing one coil C1 to move the armature 178 in one direction i.e., the leftward direction of FIG. 17, wherein the poppet end face 175A sealingly engages the end wall rib 162B. As the armature 178 moves left, the poppet 176 is pulled leftwardly with the armature 178 away from the outlet 166 to open same. The spring 177 compresses and pushes the other poppet 175 against the inlet 164 to close same.

In the second valve open condition, the armature 178 is displaced by energizing the other coil C2 to move the armature 178 in the opposite rightward direction of FIG. 16, wherein the poppet 176 sealingly engages the end wall rib 163B. As the armature 178 moves right, the poppet 175 is pulled rightwardly with the armature 178 away from the inlet 164 to open same. The spring 177 compresses and pushes the other poppet 176 against the outlet 166 to close same. A further detailed description of the operation of the coils C1 and C2 and their effect on the valve components and air flow is provided above and does not require further discussion herein.

Referring to FIG. 14, the COM ports 165 also may be formed in an annular array of circumferentially spaced ports 165. A similar array of ports 165A may be provided on the other end of the solenoid valve 160. As such, the opposite valve ends have a mirror image with respect to the inlet 164 and outlet 166 and the ports 165 and 165A so that the solenoid valve 160 is non-handed and could be installed in either orientation, wherein the port 166 could be the inlet and port 164 could be the outlet. The ports on the exhaust end of the solenoid valve such as ports 165A may be plugged, function as COM ports, or be provided with a pressure sensor.

Although particular preferred embodiments of the invention have been disclosed in detail for illustrative purposes, it will be recognized that variations or modifications of the disclosed apparatus, including the rearrangement of parts, lie within the scope of the present invention.

I claim:

1. A solenoid valve for controlling fluid flow between a pressure source, an inflatable storage bladder, and an outlet line connectable thereto, said solenoid valve comprising:
   a housing having a housing interior enclosed by axially spaced, first and second housing end walls that define opposite first and second housing ends;
   an inlet port in said first housing end wall and opening into said housing interior for receiving a supply of pressurized fluid from the pressure source;
   a communication port in said first housing end wall and opening into said housing interior for communicating the pressurized fluid to and from the storage bladder;

an outlet port in said second housing end wall and opening into said housing interior for exhausting the pressurized fluid from said housing interior to the outlet line;
   an armature movably disposed in said housing interior, which is reciprocatable toward said first and second housing ends, said armature comprising axially spaced, first and second poppets projecting from opposite armature ends and a spring member biasing said poppets axially away from each other while permitting said poppets and said spring member to float axially relative to said armature, said armature being reversibly movable along an axial stroke between opposite first and second armature positions and an intermediate third armature position therebetween;
   said first and second poppets configured to simultaneously close said inlet port and said outlet port with said armature in said third armature position to define a valve closed condition, open said inlet port and close said outlet port with said armature in said first armature position to supply fluid to said communication port and define a first valve open condition, and close said inlet port and open said outlet port with said armature in said second armature position to exhaust fluid from said communication port and define a second valve open condition; and
   first and second solenoid coils disposed in said housing, which are axially adjacent to each other and are selectively energizable to generate respective first and second magnetic fields in said housing interior proximate said first and second housing ends, said armature being in said third armature position when said first and second solenoid coils are deenergized to define said closed valve condition, and said first and second solenoid coils being energizable to displace said armature from said third armature position to said first and second armature positions depending upon which is energized to define said first and second valve open conditions.

2. The solenoid valve according to claim 1, wherein said first and second solenoid coils are wound on a single bobbin and energized one at a time.

3. The solenoid valve according to claim 1, wherein only one of said first and second poppets contacts said inlet port and said outlet port respectively when one or the other of said first and second solenoid coils is energized.

4. The solenoid valve according to claim 1, wherein said armature returns to said third armature position when an energized one of said first and second solenoid coils is deenergized, said spring member and said poppets acting on said armature to return said armature to said third armature position.

5. The solenoid valve according to claim 4, wherein said armature is movable axially relative to said spring member and said first and second poppets.

6. The solenoid valve according to claim 5, wherein said first and second poppets include first and second poppet stop formations and said armature includes first and second armature stop formations which cooperate to permit limited movement therebetween while preventing separation.

7. The solenoid valve according to claim 1, wherein said armature is movable axially relative to said spring member and said first and second poppets.

8. The solenoid valve according to claim 7, wherein said first and second poppets include first and second poppet stop formations and said armature includes first and second armature stop formations which cooperate to permit limited movement therebetween while preventing separation.

9. The solenoid valve according to claim 1, wherein said armature has an axial length less than a distance between said inlet port and said outlet port so that said armature is axially movable between said first and second armature positions.

10. The solenoid valve according to claim 9, wherein said first and second poppets project axially out of said armature under spring pressure from said spring to normally close said inlet port and said outlet port when said armature is in said third armature positions.

11. The solenoid valve according to claim 10, wherein said first and second poppets can move independent of each other inwardly into said armature interior during compression of said spring member as said armature moves toward each one of said first and second armature positions.

12. A solenoid valve for controlling air between a pressure source and an external pressure receiver, said solenoid valve comprising:

a housing having a housing interior enclosed by axially spaced, first and second housing end walls that define opposite first and second housing ends;

an inlet port in said first housing end wall and opening into said housing interior, which is configured for receiving a supply of pressurized fluid from a pressure supply;

a communication port in said first housing end wall and opening into said housing interior, which is configured to be selectively pressurized and depressurized for communicating a reversible flow of the pressurized fluid through said communication port;

an outlet port in said second housing end wall and opening into said housing interior for exhausting the pressurized fluid from said housing interior through said outlet port;

an armature movably disposed in said housing interior, which is reciprocatable toward said first and second housing ends, said armature comprising axially spaced, first and second poppets projecting from opposite armature ends and a spring member biasing said poppets axially away from each other while permitting said poppets and said spring member to float axially relative to said armature, said armature being reversibly movable along an axial stroke between opposite first and second armature positions and an intermediate third armature position therebetween;

said first and second poppets configured to simultaneously close said inlet port and said outlet port with said armature in said third armature position to define a valve closed condition, open said inlet and close said outlet port with said armature in said first armature position to supply pressurized fluid to said communication port and define a first valve open condition wherein said communication port is pressurized, and close said inlet port and open said outlet port with said armature in said second armature position to exhaust pressurized fluid from said communication port and define a second valve open condition wherein said communication port is depressurized; and first and second solenoid coils disposed in said housing, which are axially adjacent to each other and are selectively energizable to generate respective first and second magnetic fields in said housing interior proximate said first and second housing ends, said armature being in said third armature position when said first and second solenoid coils are deenergized to define said closed valve condition, and said first and second coils being energizable to displace said armature from said third armature position to said first and second armature positions depending upon which of the first and second solenoid valves is energized to define said first and second valve open conditions.

13. The solenoid valve according to claim 12, wherein said first and second solenoid coils are wound on a single bobbin and energized one at a time.

14. The solenoid valve according to claim 12, wherein only one of said first and second poppets contacts said inlet port and said outlet port respectively when one or the other of said first and second solenoid coils is energized.

15. The solenoid valve according to claim 12, wherein said armature returns to said third armature position when an energized one of said first and second coils is deenergized, said spring member and said poppets acting on said armature to return said armature to said third armature position.

16. The solenoid valve according to claim 12, wherein said armature is movable axially relative to said spring and said first and second poppets.

17. The solenoid valve according to claim 16, wherein said first and second poppets include first and second poppet stop formations and said armature includes first and second armature stop formations which cooperate to permit limited movement therebetween while preventing separation.

18. The solenoid valve according to claim 12, wherein said armature has an axial length less than a distance between said inlet port and said outlet port so that said armature is axially movable between said first and second armature positions.

19. The solenoid valve according to claim 18, wherein said first and second poppets project axially out of said armature under spring pressure from said spring to normally close said inlet port and said outlet port when said armature is in said third armature positions.

20. The solenoid valve according to claim 19, wherein said first and second poppets can move independent of each other inwardly into said armature interior during compression of said spring member as said armature moves toward each one of said first and second armature positions.

* * * * *